March 27, 1956 R. ADLER 2,740,002

BALANCED SYNC SEPARATOR AND PHASE COMPARATOR SYSTEM

Filed Dec. 6, 1951 2 Sheets-Sheet 1

*INVENTOR:*
ROBERT ADLER
BY Francis W. Crotty
HIS ATTORNEY.

March 27, 1956 R. ADLER 2,740,002

BALANCED SYNC SEPARATOR AND PHASE COMPARATOR SYSTEM

Filed Dec. 6, 1951 2 Sheets-Sheet 2

INVENTOR:
ROBERT ADLER
BY Francis W. Crotty
HIS ATTORNEY.

United States Patent Office 2,740,002

Patented Mar. 27, 1956

2,740,002

BALANCED SYNC SEPARATOR AND PHASE COMPARATOR SYSTEM

Robert Adler, Northfield, Ill., assignor to Zenith Radio Corporation, a corporation of Illinois Application December 6, 1951, Serial No. 260,221

4 Claims. (Cl. 178—7.3)

This application is a continuation-in-part of the co-pending application of Robert Adler, Serial No. 139,402, filed January 19, 1950, and now abandoned, for "Separation of Line and Frame Pulses by System Providing Automatic Frequency Control of Line Sweep Generator," and assigned to the same assignee as the present application.

This invention relates to electronic communications systems and, more particularly, to synchronizing-control apparatus for use in a television receiver or the like.

In the reception of television signals, it is necessary to insure that the scanning operations at the receiver are maintained in synchronization with those at the transmitting station. For this purpose, the composite television signal radiated by commercial transmitting stations contains line-frequency and field-frequency synchronizing-signal components which are utilized at the receiver to drive local line-frequency and field-frequency scanning-signal generators. It has been found particularly advantageous to provide automatic-frequency-control at the receiver for the line-frequency synchronizing system, in order to prevent loss of synchronization in the event that large noise signals may be superimposed from time to time on the composite television signal. The automatic-frequency-control system may comprise, for example, a phase-detector operated in conjunction with a reactance-tube system or other frequency-control device to insure positive synchronizing action. Customarily, separate receiver stages are provided for each of the functions of synchronizing-signal separation, phase-comparison between the incoming synchronizing signals and the locally-generated scanning signals, and frequency-control of the local scanning-signal generator. In addition, a second scanning-signal generator is customarily used to provide field-frequency scanning signals for the image-reproducing device. It is a primary object of the present invention to provide a novel and improved synchronizing-control apparatus for a television receiver or the like, which combines the functions of synchronizing-signal separation and phase-comparison in a single stage.

It is a further object of the invention to provide improved synchronizing-control apparatus having a minimum number of component parts.

Still another object of the invention is to provide improved synchronizing-control apparatus which is eminently suited for performing the functions of synchronizing-signal separation, phase-comparison between incoming synchronizing signals and locally-generated scanning signals, and frequency-control of the local scanning-signal generator in a television receiver.

Yet a further object of the invention is to provide novel and improved synchronizing-control apparatus comprising a combination synchronizing-signal separator, balanced automatic-frequency-control phase-detector, and frequency-control device for controlling the frequency of the local scanning-signal generator in a television receiver.

In accordance with the present invention, a new and improved combined synchronizing-signal separator and automatic-frequency-control phase-detector for a television receiver including line-frequency and field-frequency scanning systems comprises an electron-discharge device having an electron gun for projecting a beam of electrons, and a pair of output electrodes. Means are provided for controlling the beam to restrict space electron flow to the output electrodes to synchronizing-signal intervals of received composite video signals. Means including individual output circuits respectively connected to the output electrodes are provided for developing a balanced automatic-frequency-control potential for application to the line-frequency scanning system. The apparatus also comprises means including another output circuit coupled to both of the output electrodes for developing field-frequency synchronizing-signal pulses for application to the field-frequency scanning system.

The features of the present invention which are believed to be novel are set forth with particularity in the appended claims. The invention, together with further objects and advantages thereof, may more readily be understood, however, by reference to the following description taken in connection with the accompanying drawings, in the several figures of which like reference numerals indicate like elements, and in which:

In the preferred embodiment of the present invention, a special electron-discharge device comprising two electrode systems, having a number of component parts in common with each other and effectively defining two independent electron-discharge paths, and supported within an evacuated envelope, is particularly useful. For convenience in explaining the operation of the invention, the two electrode systems are separately illustrated in cross-section in Figures 1 and 2 respectively.

Figure 1:
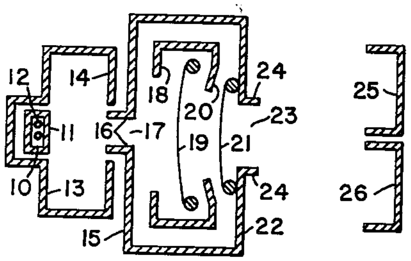
Figures 1 and 2 are different cross-sectional views of an electron-discharge device which is useful in apparatus constructed in accordance with the present invention.

In Figure 1, the first electrode system of a special discharge device or tube comprises a cathode 10 having a substantially planar emitting surface 11 and provided with a heater element 12. An auxiliary electrode 13 having portions substantially coplanar with emitting surface 11, is arranged to restrict electron emission from cathode 10 to a single general direction. A focusing electrode 14, which may for convenience be constructed integrally with auxiliary electrode 13, is also provided, and a first accelerating electrode 15 is provided with a pair of opposed lips 16 extending toward cathode 10 and terminating at a distance from those boundaries of focusing electrode 14 nearest cathode 10 which does not exceed a small fraction of the width of the aperture 17 defined by lips 16. Cathode 10, auxiliary electrode 13, focusing electrode 14, and first accelerating electrode 15 constitute an electron gun which is constructed in accordance with Patent No. 2,559,037 issued July 3, 1951, to Robert Adler for "Electron-Discharge Device of the Focused-Beam Type," and assigned to the present assignee.

Following the aperture 17 of first accelerating electrode 15, there are disposed in the order named a second focusing electrode 18, a control grid 19, a third focusing electrode 20, and a second accelerating electrode comprising a screen grid 21 and a beam-directing portion 22 having an aperture 23 defined by a pair of opposed lips 24 extending in a direction away from the electron gun. Control grid 19 is preferably spaced from first accelerating electrode 15 by a distance greater than the smallest transverse dimension of aperture 17. Consequently, accelerating electrode 15 and control grid 19 comprise a high-transconductance intensity-control system as disclosed and claimed in U. S. Patent 2,511,143 issued June 13, 1950, to Robert Adler for "Electron-Discharge Devices," and assigned to the same assignee as the present application.

Third focusing electrode 20 and screen grid 21 constitute a convergent electron lens for refocusing electrons passed by control grid 19; this arrangement is identical with that described in Patent 2,559,037.

A pair of anodes 25 and 26, respectively having active portions on opposite sides of the path of an undeflected electron beam emerging from the electron lens comprising focusing electrode 20 and screen grid 21, are provided; anodes 25 and 26 are of sufficient lateral extent to accommodate the full lateral deflection of the electron beam. Alternatively, anodes 25 and 26 may be of lesser lateral extent, and an additional anode (not shown) may be provided, as shown and described in the parent application.

While it is within the scope of the present inveniton to utilize a structure for producing a focused pencil-like beam of circular cross-section, it is preferred that all of the electrodes extend in a direction perpendicular to the plane of the drawing for a distance which is large relative to the width of cathode 10; with such an arrangement, a focused sheet-like electron beam of substantially rectangular cross-section is formed. The beam may be subjected to intensity-control by high-transconductance control grid 19 in the manner described in the above-identified patents, and the convergent electron lens following control grid 19 serves to refocus electrons passed by the control grid to project a refocused beam through aperture 23. The refocused beam emerging from the electron lens may then be subjected to deflection-control in a manner to be described in greater detail hereinafter, and the pair of anodes 25 and 26 may be utilized to derive a balanced output signal. Anodes 25 and 26 may also be utilized to provide an additional useful output signal in a manner to be hereinafter described.

Anodes 25 and 26 preferably are identically constructed and positioned symmetrically with respect to the path of an undeflected electron beam emerging from the convergent electron lens. In order to suppress secondary emission from anodes 25 and 26, each of the anodes is preferably provided with flanged portions extending toward the electron lens in such a manner that secondary electrons released from the active portions of the anodes are, for the most part, collected by the same anode structure whence they originate. In order to suppress secondary electron emission, it may be desirable to provide grounded elements (not shown) between anodes 25 and 26, in a manner well known in the art.

Figure 2:
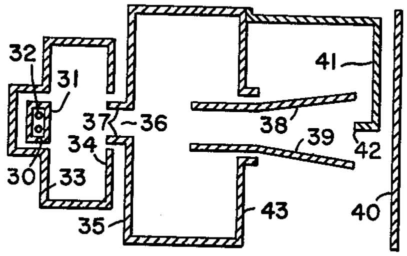

Figure 2 is a sectional view of a deflection-control electron-discharge device which may advantageously comprise an electron gun similar to that utilized in the device of Figure 1, comprising a cathode 30 having a substantially planar emitting surface 31 and provided with a heater element 32, an auxiliary electrode 33 having active portions substantially coplanar with surface 31, a focusing electrode 34, and an accelerating electrode 35 having an aperture 36 defined by a pair of opposed lips 37 extending toward cathod 30 and terminating at a distance from those boundaries of focusing electrode 34 nearest cathode 30 which is a small fraction of the width of aperture 36. A pair of electrostatic-deflection electrodes 38 and 39 are symmetrically arranged with respect to the path of the electron beam projected through aperture 36, and an output anode 40 is disposed across the path of an electron beam projected between deflection electrodes 38 and 39. An intercepting anode 41, having an intercepting edge 42 which is centrally disposed with respect to the path of an undeflected electron beam projected between deflection electrodes 38 and 39, is also provided. For structural convenience, intercepting anode 41 may be supported, as by welding or the like, by accelerating electrode 35, and a second accelerating electrode 43 may be provided for ease in combining the electrode systems of Figures 1 and 2 in a single unitary structure.

The arrangement of Figure 2 is a conventional deflection-control electron-discharge device, with the exception of the particular structure used for the electron gun. An electron beam projected through aperture 36 is deflected in accordance with a signal applied between deflection electrodes 38 and 39 so that the beam is periodically switched from output anode 40 to intercepting anode 41 and vice-versa. Thus, the output signal developed in the output circuit (not shown) associated with output anode 40 comprises essentially a square-wave voltage, in a manner well known in the art.

Figure 3:
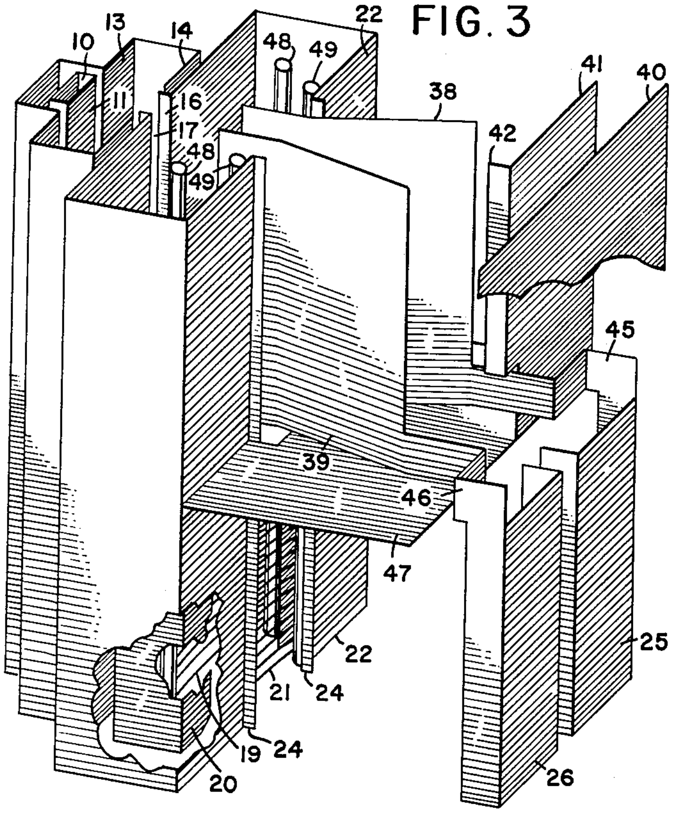
Figure 3 is a perspective view, partially cut away, of the electrode system of the novel and improved electron-discharge device shown in cross-section in Figures 1 and 2.

Figure 3 is a perspective view, partially cut away, of the electrode arrangement of a novel electron-discharge device combining the electrode systems of Figures 1 and 2 in a single unitary electrode structure. The device of Figure 3 comprises an electron gun including an elongated cathode 10 having an emissive surface 11 and an accelerating electrode 15 having a slot 17 parallel to cathode 10. A pair of electrode systems are disposed across the paths of different portions of the electron beam projected through slot 17 of first accelerating electrode 15. The lower system is similar to that shown in Figure 1 and comprises control grid 19, a convergent electron lens including focusing electrode 20 followed by screen grid 21, beam-directing member 22, and anodes 25 and 26. The upper electrode system comprises electrostatic-deflection electrodes 38 and 39, as well as output anode 40 and intercepting anode 41.

Anodes 25 and 26 of the lower electrode system are electrically connected respectively to electrostatic deflection electrodes 38 and 39 by means of connector strips 45 and 46; for ease of manufacture, each of the deflection plates and its associated anode may be formed from a single flat metal stamping which is then formed to the desired configuration.

Intercepting anode 41 is preferably welded or otherwise secured to second accelerating electrode 22 in such a manner as to form an effective shield between the two electrode systems; to this end, intercepting anode 41 comprises a shield portion 47 extending beneath the deflection electrodes 38 and 39 transversely of the tube and secured to accelerating electrode 22. Preferably, for reasons hereinafter to be made apparent, all of the electrodes following beam-directing member 22 and comprising deflection electrodes 38 and 39, output anode 40, intercepting anode 41, and anodes 25 and 26, are constructed of non-magnetic material.

The complete electrode structure is supported within an envelope (not shown) by any suitable arrangement known in the art, as by means of a pair of mica spacer-discs, and the envelope is then evacuated and gettered in the usual fashion. External circuit connections are provided for cathode 10, the accelerator box comprising accelerating electrode 15 and beam-directing member 22 (to which screen grid 21 is connected), deflection electrode 38 and anode 25, deflection electrode 39 and anode 26, output anode 40, and control grid 19; in addition, a pair of external connections are provided for the heater element associated with cathode 10, not shown in Figure 3 to avoid confusing the drawing.

Focusing electrodes 14, 18, and 20 and auxiliary electrode 13 may conveniently be electrically connected internally to cathode 10 and thereby operated at cathode potential, and screen grid 21 may be secured to the accelerator box for operation at a common potential therewith. The support rods 48 for control grid 19 and rods 49 for screen grid 21 may be extended through the upper electrode system for mounting convenience. Optionally, the focusing electrode structure comprising second and third focusing electrodes 18 and 20 may also be extended for the full length of the electrode structure (not shown). Moreover, it may be possible to obtain satisfactory operation by omitting beam-directing member 22.

Figure 4:
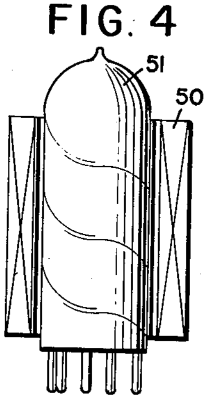
Figure 4 is a side view, partly in section, of the device of Figure 3 in cooperation with a magnetic-deflection coil.

With reference to Figure 4, a magnetic-deflection coil 50 is arranged externally of the envelope 51 in which the electrode structure of Figure 3 is supported, in order to provide a deflection field within the device in a direction substantially parallel to cathode 10, thereby providing a means for transversely deflecting the electron beam. Transverse deflection of the beam, however, may be accomplished by any other means known to the art.

The novel features of the electron-discharge systems per se shown and described in connection with Figures 1–4, are specifically claimed in the copending application of Robert Adler, Serial No. 139,401, filed January 19, 1950, now U. S. Patent No. 2,606,300, issued August 5, 1952, for "Electron-Discharge Devices," and assigned to the present assignee.

An electron-discharge device constructed in accordance with the foregoing specification is particularly, although not exclusively, useful in synchronizing-control systems for television receivers or the like. A television receiver incorporating a synchronizing-control system utilizing the novel device and constructed in accordance with the present invention is illustrated schematically in Figure 5.

Figure 5:
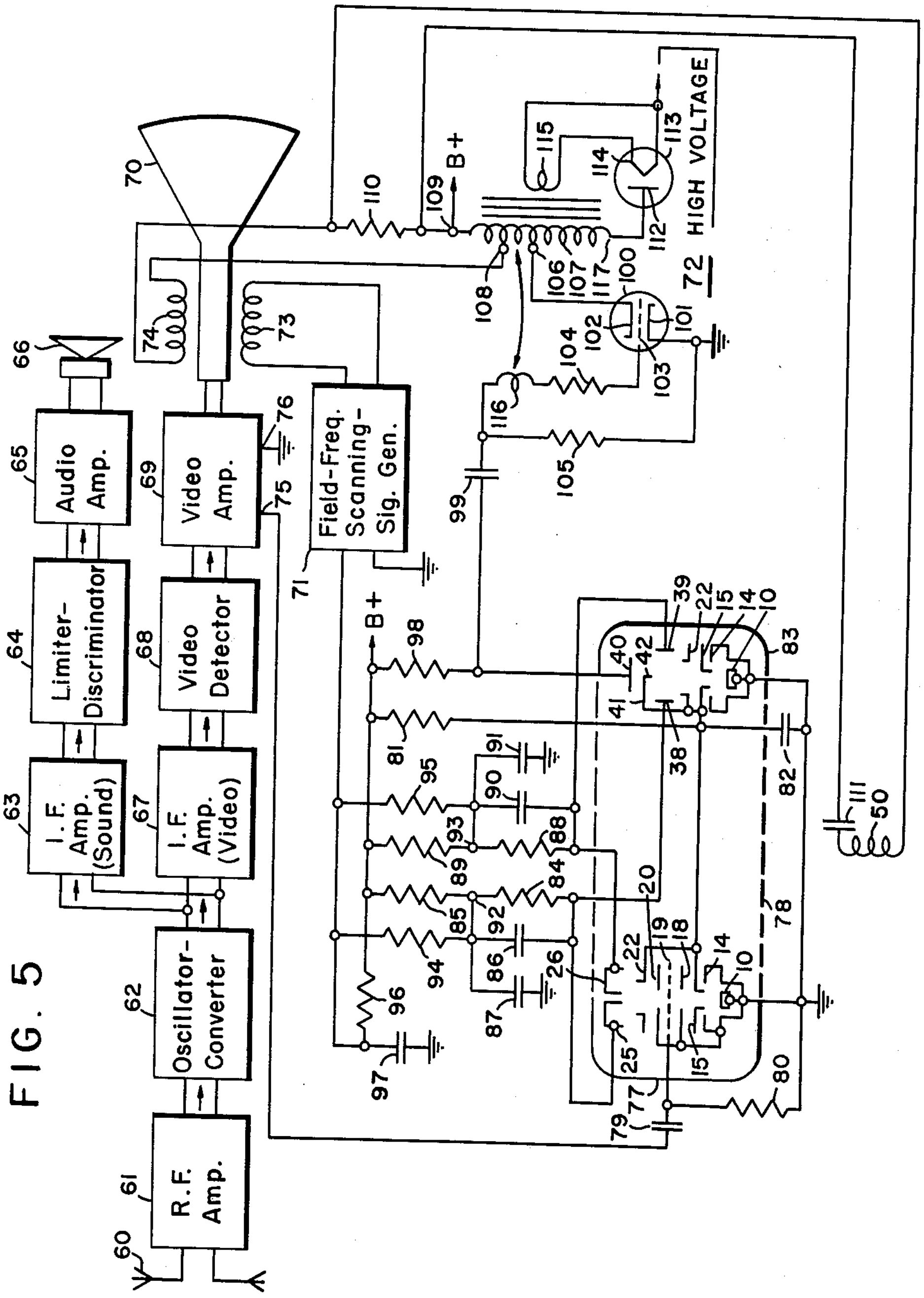
Figure 5 is a schematic circuit diagram of a television receiver embodying synchronizing-control apparatus constructed in accordance with the invention.

In Figure 5, incoming composite television signals are intercepted by an antenna 60, selected and amplified by a radio-frequency amplifier 61 comprising any desired number of stages, and applied to an oscillator-converter 62 for heterodyning with a locally generated signal. Intermediate-frequency sound signals from oscillator-converter 62 are amplified by any desired number of stages 63 of intermediate-frequency amplification, and the amplified sound signals are limited and detected by means of a limiter-discriminator 64. Audio-frequency output from limiter-discriminator 64 is amplified by means of an audio amplifier 65 and applied to a loud speaker 66 or other sound-reproducing device.

Intermediate-frequency video signals from oscillator-converter 62 are amplified by any desired number of stages 67 of intermediate-frequency video amplification and are applied to a video-detector 68. Detected composite video signals from video detector 68 are applied to a video amplifier 69 and thence to the input circuit of a cathode-ray tube 70 or other image-reproducing device.

Alternatively, an intercarrier sound system may be used, in which event intermediate-frequency amplification of both video and sound signals may be accomplished in a single channel.

In order to insure receiver synchronization, there is also provided synchronizing-control apparatus including a field-frequency scanning-signal generator 71 and a line-frequency scanning-signal generator 72. Field-frequency scanning-signals from generator 71 and line-frequency scanning signals from generator 72 are applied to the appropriate deflection coils, 73 and 74 respectively, associated with image-reproducing device 70.

In conventional television receivers, proper synchronization of the field-frequency and line-frequency scanning-signal generators is accomplished by means of a synchronizing chain, comprising a synchronizing-signal separator, an automatic-frequency-control phase-detector, and a reactance-tube or other frequency-control device, responsive to the synchronizing-signal components of the detected composite video signal for synchronizing the frequency and phase of the respective scanning-signal generators; in conventional receivers, these functions are accomplished by means of relatively complex circuit arrangements including at least three electron-discharge devices. These functions, however, in accordance with the present invention, may all be accomplished with a relatively simple circuit using a single electron-discharge device of the type shown and described in connection with Figures 1–4.

To this end, detected composite video signals comprising positive-polarity line-frequency and field-frequency synchronizing-signal components are applied from terminals 75 and 76 of video amplifier 69, by means of a coupling condenser 79 and a grid resistor 80, between the control grid 19 and the cathode 10 of the lower section 77 of an electron-discharge device 78 of the type shown in Figure 3. Cathode 10 is directly connected to ground, and focusing electrodes 14, 18, and 20 are internally connected to cathode 10. Accelerating electrodes 15 and 22 are connected to a suitable source of positive unidirectional operating potential, conventionally designated B+, by means of a resistor 81, and are bypassed to ground by a condenser 82. Anode 25 is connected (preferably internally) to deflection electrode 38 of the upper section 83 of device 78 and is also connected to B+ through a pair of serially connected resistors 84 and 85; a condenser 86 is connected in parallel with resistor 84, and another condenser 87 is connected between the junction 92 of resistors 84 and 85 and ground. Similarly, anode 26 is connected (preferably internally) to deflection electrode 39 and is also connected to B+ through a pair of serially connected resistors 88 and 89; a condenser 90 is connected in parallel with resistor 88, and another condenser 91 is connected between the junction 93 of resistors 88 and 89 and ground. Junctions 92 and 93 are connected through resistors 94 and 95 respectively to an additional output resistor 96 connected to B+, and output resistor 96 is coupled by means of an integrating condenser 97 to field-frequency scanning-signal generator 71.

In the upper section 83 of device 78, intercepting anode 41 is internally connected to accelerating electrodes 15 and 22. Output anode 40 is connected through an output load resistor 98 to B+ and is coupled to line-frequency scanning-signal generator 72 by means of a differentiating network including a coupling condenser 99 and an input resistor 105.

Line-frequency scanning-signal generator 72 may conveniently comprise a bidirectional electron-discharge device 100, constructed in accordance with the copending application of Robert Adler, Serial No. 129,554, filed November 26, 1949, for "Electron-Discharge Device and Circuits," and assigned to the present assignee. Such a device comprises a pair of thermionic cathodes 101 and 102 with a control grid 103 intermediate the cathodes to control electron space current flow within the device. One of the cathodes 101 is directly connected to ground, and control grid 103 is coupled to cathode 101 by means of a series input circuit comprising a current-limiting resistor 104, a feedback coil 116 inductively coupled to coil 107, and input resistor 105. The other cathode 102 is connected to a tap 106 on an output inductor 107 and one terminal 109 of coil 107 is connected to B+. Line-frequency deflection coil 74 associated with image reproducing 70 is coupled between terminal 109 of coil 107 and a second tap 108 on that coil intermediate tap 106 and B+, and a small resistor 110 is included in series with deflection coil 74. The voltage developed across resistor 110 is applied to the series combination of magnetic-deflection coil 50 associated with device 78 and a tuning and phasing condenser 111 adjusted to resonate with coil 50 at the line-frequency.

Briefly, the operation of line-frequency scanning-signal generator 72 is as follows: At the beginning of each scanning-cycle, cathode 102 is at a lower potential than grounded cathode 101, and negative current flows through the output coil 107. The potential of cathode 102 rises uniformly at a rate determined by the ratio of the supply voltage to the inductance of the portion of coil 107 between B+ and tap 106 until, slightly before the middle of the scanning-cycle, the potential of cathode 102 becomes positive with respect to ground. Current-flow in device 100 is then reversed, and the potential of cathode 102 continues to rise at the same rate until a negative-polarity pulse is applied to the input circuit to render device 100 non-conductive. During the non-conductive period, a large positive-polarity pulse is produced between cathode 102 and ground. Feedback coil 116 operates to apply a proportional negative-polariy pulse to the input circuit, thereby effectively reducing the required amplitude of the trigger pulse.

If the feedback voltage ratio between tickler-coil 116 and output coil 107 is made materially greater than the reciprocal of the effective transconductance of control grid 103 with respect to ungrounded cathode 102, the circuit becomes self-sustaining, and trigger pulses of reduced amplitude and duration may be used to synchronize the scanning-signal generator. Such a self-sustaining arrangement is disclosed and claimed in the copending application of Jack E. Bridges, Serial No. 129,671, filed November 26, 1949, now U. S. Patent No. 2,591,914, issued April 8, 1952, for "Self-Sustaining Sawtooth Current Generators," and assigned to the same assignee as the present application.

In order to provide high voltage for operating image-reproducing device 70, the second terminal 117 of coil 107 is connected to the anode 112 of a rectifier device 113, the filament 114 of which may be energized by means of a secondary winding 115 inductively coupled to output coil 107, in a manner well known in the art.

In operation, detected composite video signals, comprising positive-polarity line-frequency and field-frequency synchronizing-signal pulses, are applied to the control grid circuit of the lower section 77 of device 78 by circuit means comprising coupling condenser 79 and grid resistor 80. In order to provide synchronizing-signal slicing, or double clipping, the time-constant of the input circuit comprising condenser 79 and resistor 80 is preferably made at least as long as the period of the field-frequency. Since the control characteristic of control grid 19 is of the form of a step function, comprising two input-voltage ranges of substantially zero transconductance separated by an input-voltage range of high transconductance, the control grid 19 allows the lower portion of the sheet-like electron beam to pass only when the control grid potential is more positive than a predetermined minimum; in other words, control grid 19 operates as a beam gate. With an input circuit of an appropriate time-constant, grid 19 is self-biased by the flow of grid current during synchronizing-signal pulse intervals. Because the grid current characteristic is limited as a result of the construction of the control system comprising accelerating electrode 15 and control grid 19, only intermediate portions of the synchronizing-signal pulses are reproduced in the electron beam passed by control grid 19. This operation is explained in detail in the copending application of Erwin M. Roschke et al., Serial No. 94,642, filed May 21, 1949, for "Signal-Slicing Circuits," and assigned to the present assignee.

Alternatively, other types of beam-control system may be employed to restrict space electron flow to anodes 25 and 26 to synchronizing-signal intervals, as for example a deflection-control system followed by an apertured target electrode preceding the phase-detector anodes. A suitable arrangement of this type is disclosed and claimed in the copending application of John G. Spracklen, Serial No. 246,768, filed September 15, 1951, for "Television Receiver," and assigned to the present assignee.

If it is now assumed that the signal applied to magnetic-deflection coil 50 associated with device 78 is so phased as to pass through zero at exactly the instants when the line-frequency synchronizing-signal pulses occur, the beam passed by control grid 19 during line-frequency synchronizing-signal pulse intervals is undeflected and is divided equally between anodes 25 and 26; consequently, the output voltages developed in the respective output circuits associated with anodes 25 and 26 are equal when the magnetic scanning-signal is properly phased with respect to the incoming line-frequency synchronizing-signal pulses.

At the same time, the portion of the sheet-like beam projected from the electron gun in the upper section 83 of device 78 is periodically deflected in a lateral direction due to the alternating magnetic deflection field set up by coil 50. Thus, a negative pulse is developed across resistor 105 each time the beam is switched from intercepting anode 41 to output anode 40, and a positive pulse is developed across resistor 105 each time the beam on its return swing is switched from output anode 40 to intercepting anode 41. If, as already assumed, the deflection signal applied to coil 50 is so phased as to pass through zero at exactly the instants when the line-frequency synchronizing-signal pulses occur, and if the coil 50 is so oriented with respect to device 78 as to switch the electron beam in the upper section from intercepting anode 41 to output anode 40 at these instants, negative polarity pulses are produced across resistor 105 in synchronism with the line-frequency synchronizing-signal pulses. These sharp potential drops are utilized to trigger the line-frequency scanning-signal generator 72 and for this purpose are coupled to the input circuit of device 100 by means of condenser 99 and resistor 105 which are of such respective magnitudes as to provide a time constant which is short relative to the period of the line-frequency, thereby to provide a differentiating action.

If the deflection signal across coil 50 is not properly phased with respect to the incoming line-frequency synchronizing-signal pulses, the phase of the output signal appearing across resistor 98 is automatically shifted by an amount proportional to the deviation from synchronism and in a direction to restore synchronism.

For example, the incoming line-frequency synchronizing-signal pulses may instantaneously lag the deflection signal applied to coil 50. If it is assumed that the polarity of the signal applied to coil 50 is such as to cause the sheet-like beam of device 78 to switch from intercepting anode 41 to output anode 40 (i. e. if the deflection signal swings through zero at approximately the moment when the line-frequency synchronizing-signal pulse is expected), a larger portion of the beam passed by control grid 19 during the synchronizing-pulse interval is collected by anode 26 than by anode 25. Consequently, the potential of anode 26 is decreased relative to that of anode 25. As a result, the electrostatic deflection-field set up between deflection electrodes 38 and 39, which are direct-coupled to anodes 25 and 26 respectively, opposes the magnetic deflection-field established by coil 50 and retards the lateral deflection from left to right of the beam in the upper section 83 of device 78. Therefore, during the cycle under consideration, the switching of the beam from intercepting anode 41 to output anode 40 is retarded, and the negative-polarity pulses developed across resistor 105 is maintained in phase with the incoming line-frequency synchronizing-signal pulse.

On the other hand, if the line-frequency synchronizing-signal pulses instantaneously lead the deflection signal applied to coil 50, the potential of anode 25 is reduced relative to that of anode 26, and the electrostatic deflection-field set up between deflection electrodes 38 and 39 is in such a direction as to aid the lateral deflection of the beam in the upper section 83 and advance the negative-polarity pulse appearing across resistor 105. Thus, phase deviations of the deflection signal applied to coil 50 relative to the incoming line-frequency synchronizing-signal pulses are compensated.

Thus, the lower section 77 of device 78 effectively performs the functions of synchronizing-signal separation and balanced automatic-frequency-control phase-detection. Any deviation from exact phase synchronism between the incoming line-frequency synchronizing-signal pulses and the scanning signals developed by generator 72 is reflected in an unbalance between the potentials of anodes 25 and 26. This potential unbalance is transferred by direct-coupling to electrostatic-deflection electrodes 38 and 39 in such a sense as to advance or retard the negative-polarity output pulses appearing across resistor 105 by an amount just sufficient to compensate for the original phase difference. Consequently, the line-frequency scanning-signal generator 72 is triggered at exactly the proper moment to maintain the receiver scanning in synchronism with that at the transmitter.

In order to prevent loss of synchronization and "tearing out" in the event that the incoming line-frequency synchronizing-signal pulses are momentarily over-ridden by extraneous noise signals, the output circuits associated with anodes 25 and 26, comprising resistor 85 and condenser 87 in the one instance and resistor 89 and condenser 91 in the other, are each chosen to provide a time constant of several line intervals; for example, the time constant may be chosen to be approximately equal to 100 line intervals. As in conventional automatic-frequency-control arrangements, however, the integrating action of the output circuits must be restricted sufficiently to enable the line-frequency scanning-signal generator initially to lock in with the incoming line-frequency synchronizing-signal pulses when the receiver is first set into operation.

Condensers 86 and 90 are provided to bypass alternating components of the balanced direct-voltage control signal applied between deflection electrodes 38 and 39; alternatively, a single condenser (not shown) may be connected between deflection electrodes 38 and 39 for this purpose. Because the balanced automatic-frequency-control signal is utilized by applying it between a pair of electrostatic-deflection electrodes, this signal may be direct-coupled to the deflection plates; no blocking condensers are needed because a balanced electrostatic-deflection system operates most efficiently when equal positive biasing voltages are applied to the electrostatic-deflection electrodes.

Since the time constant of the input circuit comprising condenser 79 and resistor 80 is preferably made at least as long as the period of the field-frequency, field-frequency synchronizing-signal pulses are also subjected to a slicing action. The output currents to anodes 25 and 26 during field-frequency pulse intervals are effectively combined in common load resistor 96 by virtue of the connections of resistors 94 and 95 to produce constant-amplitude negative-polarity voltage pulses across output load resistor 96. These pulses are integrated by means of condenser 97 and applied to field-frequency scanning-signal generator 71 to maintain proper field-frequency scanning synchronism of the receiver with respect to the transmitter.

With the output current from line-frequency scanning-signal generator 72 providing the magnetic deflection for the upper section 83 of device 78, and with the output anode 40 of that section providing trigger pulses for the line-frequency scanning-signal generator 72, a feedback loop is established for providing self-sustaining scanning-signal oscillations. Consequently, scanning-signal generator 72 may be either of the self-sustaining type disclosed and claimed in the Bridges application or of the non-self-sustaining type disclosed and claimed in Adler application Serial No. 129,554. Preferably, however, to insure the start of oscillation around the feedback loop, generator 72 is of the self-sustaining variety.

It is also possible to utilize a conventional discharge-tube scanning-signal generator in conjunction with the synchronizing-control apparatus incorporating device 78; however, when such a conventional discharge-tube generator is used, the direction of the magnetic field produced by coil 50 must be reversed since positive-polarity pulses are required to trigger the scanning-signal generator.

In the illustrated embodiment, it is convenient to provide lateral deflection of the sheet-like electron beam by using an external magnetic-deflection coil 50 which is responsive to the line-frequency scanning signals to operate as a deflection-control device. Consequently, in order to obtain the maximum magnetic deflection for a given field strength, it is preferred to construct all of the electrodes following the second accelerating electrode 22 of non-magnetic material. The material of which the electron gun and the intensity-control system are constructed may be either magnetic or non-magnetic, since deflection in this portion of the device is relatively unimportant.

While the system of Figure 5 utilizes a tapped portion of the output signal from the scanning-signal generator 72 to drive the deflection-control device 50, it is apparent that any other signal in synchronism with the line-frequency scanning signals may be used for this purpose. In pratice, a deflection field of the order of 10 gauss is required to provide sufficient lateral deflection of the electron beam; this corresponds to less than 1% of the energy used by the line-frequency deflection coils 74 in the yoke associated with image-reproducing device 70.

Thus, synchronizing-control apparatus constructed in accordance with the present invention affords great advantage in a television receiver. The functions of synchronizing-signal separation, automatic-frequency-control phase-detection, and frequency-control of the line-frequency scanning-signal generator are all accomplished with a single stage comprising a single electron-discharge device and a minimum number of associated circuit components.

In the illustrated embodiments, trigger pulses for driving the line-frequency scanning-signal generator are derived from an output circuit coupled to output anode 40, and intercepting anode 41 is operated at the same potential as the accelerating electrodes. However, it is apparent that intercepting anode 41 may be maintained electrically independent of the accelerating electrodes, if desired, so that output pulses of polarity opposite to that of the pulses appearing across resistor 105 may be provided across a differentiating load circuit coupled to intercepting anode 41 (not shown).

Thus, the invention provides a novel synchronizing-control system for a television receiver in which all of the functions accomplished by three or more separate tubes in present-day receivers may be accomplished with a single-electron discharge device in cooperation with a reduced number of associated circuit components.

While the invention has been shown and described in connection with a certain preferred embodiment thereof, it is apparent that numerous variations and modifications may be made, and it is contemplated in the appended claims to cover all such variations and modifications as fall within the true spirit and scope of the invention.

I claim:

1. In a television receiver including line-frequency and field-frequency scanning systems for utilizing received composite video signals, a combined synchronizing-signal separator and automatic-frequency-control phase-detector comprising: an electron-discharge device having an electron gun for projecting a beam of electrons, and a pair of output electrodes; means for controlling said beam to restrict space electron flow to said output electrodes to synchronizing-signal intervals of said received composite video signals; means coupled to said line-frequency scanning system for applying a comparison signal to said electron-discharge device to control the distribution between said output electrodes of said space current flow; means including individual output circuits respectively connected to said output electrodes, for developing a balanced automatic-frequency-control potential for application to said line-frequency scanning system; and means including another output circuit coupled to both of said output electrodes for developing field-frequency synchronizing-signal pulses for application to said field-frequency scanning system.

2. In a television receiver including line-frequency and field-frequency scanning systems for utilizing received composite video signals, a combined synchronizing-signal separator and automatic-frequency-control phase-detector comprising: an electron-discharge device having an electron gun for projecting a beam of electrons, and a pair of output electrodes; means including an intensity-control grid for controlling said beam to restrict space electron flow to said output electrodes to synchronizing-signal intervals of said received composite video signals; means coupled to said line-frequency scanning system for applying a comparison signal to said electron-discharge device to control the distribution between said output electrodes of said space current flow; means including individual output circuits respectively connected to said output electrodes for developing a balanced automatic-frequency-control potential for application to said line-frequency scanning system; and means including another output circuit coupled to both of said output electrodes for developing field-frequency synchronizing-signal pulses for application to said field-frequency scanning system.

3. In a television receiver including line-frequency and field-frequency scanning systems for utilizing received composite video signals, a combined synchronizing-signal separator and automatic-frequency-control phase-detector comprising: an electron-discharge device having an electron gun for projecting a beam of electrons, and a pair of output electrodes; means for controlling said beam to restrict space electron flow to said output electrodes to synchronizing-signal intervals of said received composite video signals; means including a deflection-control system associated with said electron-discharge device and coupled to said line-frequency scanning system for subjecting said beam to a transverse deflection field to control the distribution between said output electrodes of said space current flow; means including individual output circuits respectively connected to said output electrodes for developing a balanced automatic-frequency-control potential for application to said line-frequency scanning system; and means including another output circuit coupled to both of said output electrodes for developing field-frequency synchronizing-signal pulses for application to said field-frequency scanning system.

4. In a television receiver including line-frequency and field-frequency scanning systems for utilizing received composite video signals, a combined synchronizing-signal separator and automatic-frequency-control phase-detector comprising: an electron-discharge device having an electron gun for projecting a beam of electrons, and a pair of balanced output electrodes; means including a beam-control system for restricting space electron flow to said output electrodes to synchronizing-signal intervals of said received composite video signals; means coupled to said line-frequency scanning system for applying a comparison signal to said electron-discharge device to control the distribution between said output electrodes of said space current flow; means including individual output circuits respectively connected to said output electrodes for developing a balanced automatic-frequency-control potential for application to said line-frequency scanning system; and means including another output circuit coupled to both of said output electrodes for developing field-frequency synchronizing-signal pulses for application to said field-frequency scanning system.

References Cited in the file of this patent

UNITED STATES PATENTS

| | | |
|---|---|---|
| 2,211,860 | Plaistowe | Aug. 20, 1940 |
| 2,559,037 | Adler | July 3, 1951 |
| 2,601,415 | Oliver | June 14, 1952 |